3,278,277
TREATMENT OF ACIDIC AQUEOUS SOLUTIONS
Mayer B. Goren, Golden, Colo., assignor to Kerr-McGee Oil Industries, Inc., a corporation of Delaware
No Drawing. Filed Feb. 28, 1962, Ser. No. 176,419
35 Claims. (Cl. 23—321)

This is a continuation-in-part of my copending application Serial No. 56,657, filed September 19, 1960, now Patent No. 3,206,303, for "Process For Treating Aqueous Solutions."

This invention broadly relates to the treatment of aqueous media containing solubilized silica to reduce the silica content. In some of its more specific variants, the invention further relates to improved hydrometallurgical processes for the recovery of metal values from aqueous acidic media containing solubilized silica and to novel synthetic products produced by the method of the invention.

A variety of processes deal with aqueous media containing colloidally dispersed or molecularly dissolved silica. Such solutions are frequently encountered in hydrometallurgical operations wherein metal ores undergo a treating step involving contacting the ore with an aqueous acidic leaching solution for the purpose of solubilizing desired metal values. Examples of processes producing silica-containing solutions include the acid leaching of copper, vanadium, nickel and zinc ores, among others. During the course of the acidic leaching step, which may be mild or quite vigorous, the siliceous constituents of the gangue may be attacked and part of the silica content of the ore effectively solubilized along with the desired metal values either as a substantially molecular silicic acid or as a polymer thereof of colloidal to subcolloidal dimensions. In still other hydrometallurgical operations, impure concentrates of metals may be contaminated with "solubilized" or colloidal silica, and acid dissolution of the concentrates for further processing may give solutions contaminated with silica. In both types of processes, the silica may present difficulties in subsequent processing steps. Neutralization of the solutions to hydrolytically precipitate the metal values invariably yields a product at least partially contaminated by silica. If the liquors are to be processed by ion exchange techniques, the silica may be strongly adsorbed by a water insoluble ion exchange resin or it may undergo precipitation within the resin pores of either anion or cation resins and thereby interfere mechanically with the smooth operation of the process. The ion exchange resin may be of the types known in the art as strong base, weak base or intermediate base ion exchange resins.

Of even greater concern is the interference of the solubilized silica with liquid-liquid solvent extraction processes of the type which are currently of great importance in hydrometallurgical technology. In solvent extraction processes, the aqueous solution of the metal is usually intimately contacted in suitable prior art mixing devices with an immiscible organic liquid having solvent power for the desired metal values or with an organic solution of such a material, and the metal values are extracted from the aqueous phase into the organic phase. The immiscible liquids are then allowed to separate before they continue through the process. The presence of materials having surface-active properties hinders the complete, rapid separation of the aqueous and organic phases, and where essentially complete separation is not achieved, entrained aqueous phase will contaminate the organic phase, or vice versa. The reasons for avoiding such entrainment are obvious and well known to those skilled in the art, as is the knowledge that rapid and complete separation of the two phases is generally considered to be essential.

Among surface-active materials which promote phase disengagement difficulties is silica, such as the solubilized silica in acid leach liquors discussed above. The form in which the solubilized silica is present in the aqueous solution undoubtedly has a bearing on its effectiveness in promoting emulsification, and it is believed by those skilled in the art that it is probably not simply silicic acid [$Si(OH)_4$] that is deleterious, but more likely a condensed or polymerized form of either sub-colloidal or colloidal dimensions. It may be demonstrated that the introduction of carefully prepared silicic acid in which little or no polymer exists has substantially no effect on the phase separation behavior of an organic solvent-aqueous leach liquor system. However, more condensed silicic acids, such as those characterized by an ability to coagulate a "solution" of egg albumen or of other materials described herein does have marked deleterious effects on the ease of separation of a variety of solvent-leach liquor systems. Examples of these organic solvents include the water-insoluble alkyl and dialkyl phosphates, high molecular weight primary, secondary and tertiary amines, mixtures of these reagents which may be dissolved in kerosene as a diluent vehicle, as well as simple inert hydrocarbon systems such as kerosene, hexane, etc.

Relatively small amounts of condensed silicic acid markedly hinder phase separation after intermixing the two liquids, and also usually tend to stabilize the mixing system in such a fashion that the aqueous phase is continuous rather than the organic phase. In instances where it is desired that the organic phase be continuous due to any of a number of benefits obtained thereby, the stabilization of the aqueous phase as the continuous may markedly interfere with the smooth and efficient operation of the solvent extraction process. Accordingly, it is readily apparent that the presence of solubilized silica in leach liquors frequently introduces costly operating difficulties into hydrometallurgical processes, and that the elimination of such silica from the leach solutions would be of great commercial importance. However, prior to the present invention there has been no satisfactory process for effectively reducing the colloidally dispersed or molecularly dissolved silica of the type discussed above, and the need for such a process has long existed.

It is an object of the present invention to provide a novel process for reducing the solubilized silica content of aqueous media.

It is a further object of the invention to provide an inexpensive and practical process for the treatment of aqueous acidic solutions containing dissolved or colloidally dispersed silicic acids which are precipitable by certain precipitants.

It is still a further object of the invention to provide an improved hydrometallurgical process for the recovery of metal values from aqueous media containing solubilized silica which includes reduction of the silica present in dissolved or colloidally dispersed form by the process of the invention.

It is still a further object of the invention to provide an improved hydrometallurgical process for the recovery of metal values from aqueous media containing solubilized silica in partly polymerized form wherein the silica interferes with the recovery of the metal values, which process enables the separation of the silica in a solid filterable form so that the treated liquors thereafter may be processed without difficulty in a solvent extraction step for the recovery of the desired metal values.

It is still a further object of the invention to provide a novel product containing silica which is the reaction product in an aqueous medium of poly(ethylene oxide) and the solubilized silica described herein.

Still other objects and advantages of the present invention will be apparent to those skilled in the art upon reference to the following detailed description and the examples.

I have discovered a selective precipitation phenomenon for solubilized silica which is exhibited by water soluble organic materials containing a poly(alkylene oxide) structure, i.e., a plurality of oxyalkylene groups, and, preferably, a poly(ethylene oxide) structure, i.e., a plurality of oxyethylene groups. High molecular weight water soluble polyalkylene glycols and especially polyethylene glycols having a molecular weight from about 5000 to several million are very useful in binding and precipitating colloidal and subcolloidal silica from aqueous acidic media. Lower molecular weight organic materials such as the water soluble polyethoxylated phenols and polyethoxylated long chain amides and amines also are of utility in such applications and serve as convenient and readily accessible reagents with which to test for the presence of solubilized silica in aqueous acidic media containing partly condensed silicas which promote the processing difficulties mentioned herein.

An acid leach liquor which contains dissolved partly condensed silica will give a precipitate ranging in nature from feathery floccules to an agglomerated rubbery material depending upon the molecular weight of the precipitate when treated with the foregoing reagents. If the liquors are treated with sufficient reagent and preferably the very high molecular weight poly(ethylene oxides) such as Polyox, which is said to be a high molecular weight poly(ethylene oxide), the resulting liquor from which the rubbery silica-organic complex has been separated will no longer give a precipitate on further addition of these reagents and will behave normally in solvent extraction processes with substantially no interference from silica. Analysis shows that the so-treated liquors still contain some silica, and it is believed that the residual silica remaining in solution which is not precipitated by the reagent and which causes no emulsion difficulties in solvent extraction processes is either unimolecular silicic acid or a low molecular weight condensed polymer thereof.

Fresh, carefully prepared solutions of silicic acid having a very low degree of condensation may be added to silica-free leach solutions of the type described above to give doped leach liquors of high silica content which are free of emulsification problems and which will give no precipitation with polyoxyethylated organic reagents. On the other hand, doping of such solutions with silica solutions prepared in a manner such that soluble but condensed silicic acid is formed will give doped liquors with all the limitations to processing discussed hereinabove and which afford precipitates with these selective reagents.

For convenience, Triton X–100, a proprietary product of Rohm & Haas Company which is a polyoxyethylated phenol, has been employed for the qualitative detection of solubilized condensed silica by a test procedure wherein one or two drops of the commerical material is added to several milliliters of the acidic solution to be tested. I refer to this test as being the "Triton Test." Other materials of related structure such as the "Carbowax" products and "Ucon" lubricants marketed by Union Carbide Corporation and the water dispersible "Etho" series of compounds, "Ethomids," "Ethomeens," etc., marketed by Armour & Company, all of which have polyoxyethylene structures, serve equally well in this qualitative test and form feathery flocculent precipitates which are indicative of the presence of condensed but soluble polysilicic acids. As is well known, the above materials are polyethoxylated phenols, amides, amines, esters, etc., and thus contain a polyoxyethylene structure. Egg albumen also may be used.

I have found that an aqueous acidic solution containing polycondensed silica, the presence of which may be ascertained through the Triton test or through the use of egg albumen as a precipitant, may be reduced in polycondensed silica content by treatment with any of the hereinabove mentioned reagents, but preferably with ethylene oxide polymers. Preferably, the poly(ethylene oxide) polymers having a molecular weight of at least about 500,000, and for best results several million such as 3, 4, or 5 million and higher. Treatment of an acidic aqueous solution with a dilute solution of the preferred species of polymer results in the formation of a rubbery precipitate which binds substantially all of the polycondensed silica which is detrimental to hydrometallurgical processes, provided sufficient reagent is added. However, the silica content is reduced even when very small amounts are added. Excessive amounts of reagent are not deleterious to subsequent processing, but for practical purposes it is preferred to use only a sufficient amount to react with the polycondensed silica, bind it and form a precipitate therewith. The precipitate and its contained silica content may be separated from the solution by filtration or other method if desired.

Experiments have shown that the higher the molecular weight of the solubilized silica the smaller the quantity of poly(ethylene oxide) polymer which need be added, to precipitate a given quantity of polysilicic acid. Optimum levels of dosage on a weight basis are from about 1 part of poly(ethylene oxide) to 30 parts of precipitable condensed polysilicic acid to about 1 part of poly(ethylene oxide) polymer to about 5 parts of precipitable condensed polysilicic acid as determined by, for example, the Triton test. Better results may be obtained in some instances by employing about 1 part of the polymer to about 10–20 parts of polycondensed silicic acid. A leach liquor or an acidic aqeuous solution treated to the point of preventing further precipitation on addition of still further amounts of the polymers will not perform deleteriously in solvent extraction operations. The pH at which the aqueous medium is treated is preferably below about 4.5, and for best results about 1.0 to 2.5.

The organic compounds for use as treating agents in accordance with the invention may contain the divalent structure or grouping $(-O-R-)_n$, where R is an alkylene radical containing, for example 2 through 8 and preferably 2 through 4 carbon atoms and $n$ is an integer of at least 2. Thus, the organic compounds used as treating agents contain a plurality of alkylene oxide groups and preferably a plurality of ethylene oxide groups. The terminal valences for the divalent structure $(-O-R-)_n$ may vary widely and are not of importance provided the resultant compound is water soluble. For instance, the terminal valences may be satisfied by monovalent groups such as H, OH, alkyl, aryl, aralkyl, cycloalkyl, etc. The organic compounds for use as treating agents are molecularly or colloidally soluble in the aqueous medium to be treated for silica removal.

The wet material which is precipitated in accordance with the invention contains water which appears to be bound and it is plastic and may be formed into desired shapes. The material is unaffected by boiling with concentrated sulfuric acid, and it is not oxidized nor changed otherwise. When the material dries, the water content is lost and it becomes brittle and may be ground readily to a powder. The resultant powder may be mixed with plasticizing agents such as liquid polyethylene glycols and the material becomes quite plastic once again. Thus, the precipitated materials of the present invention may be dried, powdered, and then plasticized to produce plasticized products which are highly useful in numerous applications such as sealing agents, and particularly in nonaqueous systems where the material is subject to strenuous conditions. The material is not swollen nor attacked by substances such as kerosene or other organic solvents, and it is highly stable to normally adverse chemical conditions.

The foregoing detailed description and the following specific examples are for purposes of illustration only, and are not intended as being limiting to the spirit or scope of the appended claims.

*Example I*

A uranium ore from the Grants, New Mexico, area was leached with sulfuric acid and an oxidizing agent in the conventional manner to produce a uranium-containing acidic leach liquor having a pH of about 1.2 and containing approximately 0.7 gram per liter $U_3O_8$ in the form of the sulfate and also containing small amounts of iron, aluminum, magnesium, and vanadium in solution. This particular ore contained a certain siliceous material which dissolved partly during the leach so that the clarified leach liquor contained in solution or as a colloidal dispersion 0.936 gram per liter of silica expressed as $SiO_2$. This was the total silica content and included both the partly condensed colloidal to sub-colloidal silica as well as unimolecular and low molecular weight silicic acids.

About 500 milliliters of the above prepared leach liquor was taken and treated by slowly adding 25 milliliters of a 0.04 percent solution of a poly(ethylene oxide) of molecular weight above 1,000,000. During this treatment the leach liquor was stirred and a precipitate which was believed to be a complex of the poly(ethylene oxide) with the polycondensed silica formed and collected on the stirrer. The precipitate was separated from the solution and the solution further filtered and a sample tested with Triton X-100. Considerable cloudiness was still evident indicating that polycondensed silicic acid was still present. A sample of the treated liquor was then analyzed for total silica content and found to contain 0.596 gram of $SiO_2$ per liter. Thus 0.01 gram of poly(ethylene oxide) precipitated 0.2 gram of the polysilicic acid.

To the remainder of the treated liquor was added 25 milliliters more of the 0.04 percent poly(ethylene oxide) solution. The precipitate that formed was separated and a sample of the clear liquor was assayed and found to contain 0.453 gram of $SiO_2$ per liter. Thus, at this stage 0.01 gram of poly(ethylene oxide) precipitated approximately 8 times its weight of polycondensed silica.

Further treatment of the twice treated leach liquor with an additional portion of solution containing 0.01 gram of poly(ethylene oxide) reduced the silica content of the liquor to 0.25 gram per liter. The filtered liquor gave no further positive test with Triton X-100 thereby indicating that substanially all the polycondensed silica had been precipitated.

The treated leach liquor now could be processed by contacting it with a kerosene solution of any of the prior art organic solvent extractants for uranium mentioned herein for extraction of the uranium without the appearance of an emulsified phase and phase separation was rapid and complete.

*Example II*

The precipitate which was obtained in the preceding example and believed to be a complex of poly(ethylene oxide) with the polycondensed silica was thoroughly washed with water and rolled while wet into a ball. The ball of the precipitated material was plastic or putty-like in consistency and it could be stretched without springing back. A sample was tested for resistance to attack by concentrated sulfuric acid and it was found that even at the boiling point the material was almost entirely unaffected.

A second portion of the precipitated material was dried in an oven at 100° C. until it became brittle and could be powdered very easily. The dried material could be returned to a plastic, putty-like condition by plasticizing it with a variety of materials including low molecular weight liquid poly(ethylene oxides) such as the polyethylene glycols or liquids Carbowaxes. The plasticized material is more permanently putty-like as the plasticizing agent is retained without substantial evaporation. The plasticized material may be used for example as an organic liquid insoluble putty-like substance to fill cracks in materials such as cement where the cement may, for instance, be in contact with hydrocarbon solutions, or to fill cracks in ceramics and other materials used in storing concentrated sulfuric acid.

What is claimed is:

1. A process for precipitating a substance consisting essentially of solubilized silica contained in an acidic aqueous medium comprising admixing in the aqueous medium a water soluble organic compound containing a plurality of oxyalkylene groups of the formula

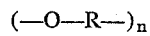

wherein R is an alkylene radical containing 2 through 8 carbon atoms and $n$ is an integer having a value of at least 2, the aqueous medium containing an impurity consisting essentially of solubilized silica which is precipitable with egg albumen, the water soluble organic compound having a molecular weight of at least 5,000 and being added in an amount to precipitate solubilized silica.

2. A composition of matter comprising the silica-containing precipitate prepared by the process of claim 1.

3. The process of claim 1 wherein the aqueous medium has a pH not greater than 4.5.

4. The proces sof claim 1 wherein the organic compound has a molecular weight of at least 500,000.

5. The process of claim 1 wherein R is an alkylene radical containing 2 carbon atoms.

6. The process of claim 1 wherein the aqueous medium has a pH not greater than 4.5 and the organic compound has a molecular weight of at least 500,000.

7. The process of claim 1 wherein the aqueous medium has a pH not greater than 4.5, R is an alkylene radical containing 2 carbon atoms and the organic compound has a molecular weight of at least 500,000.

8. The process of claim 1 wherein the organic compound is a polyalkylene glycol.

9. The process of claim 1 wherein the aqueous medium has a pH not greater than 4.5 and the organic compound is a polyalkylene glycol having a molecule weight of at least 500,000.

10. The process of claim 1 wherein the aqueous medium has a pH of about 1.0 to 2.5 and the organic compound is polyethylene glycol having a molecular weight of at least 500,000.

11. The process of claim 1 wherein the organic compound is polyethylene glycol.

12. A composition of matter comprising the silica-containing precipitate prepared by the process of claim 11.

13. In a hydrometallurgical process for the recovery of a metal value from an aqueous medium containing an impurity consisting essentially of solubilized silica precipitable with egg albumen wherein the solubilized silica normally interferes with the recovery of the metal value, the improvement comprising precipitating solubilized silica from the aqueous medium by admixing therein a water soluble organic compound containing a plurality of oxyalkylene groups of the formula $(-O-R-)_n$, wherein R is an alkylene radical containing 2 through 8 carbon atoms and $n$ is an integer having a value of at least 2, the water soluble organic compound having a molecular weight of at least 5,000 and being admixed in the aqueous medium in an amount to precipitate solubilized silica, and thereafter recovering the metal value.

14. The process of claim 13 wherein the aqueous medium has a pH not greater than 4.5 and the organic compound is polyethylene glycol having a molecular weight of at least 500,000.

15. In a process for the recovery of a metal value from a clarified aqueous medium containing an impurity consisting essentially of solubilized silica precipitable with egg albumen by extraction with a water immiscible liquid organic extractant, the organic extractant and clarified aqueous medium being intermixed and the solubilized silica normally retarding separation of the organic extractant and aqueous phases, the improvement comprising precipitating solubilized silica by admixing in the clarified aqueous medium a water soluble organic compound containing a plurality of oxyalkylene groups of the formula (—O—R—)$_n$, wherein R is an alkylene radical containing 2 through 8 carbon atoms and $n$ is an integer having a value of at least 2, the water soluble organic compound having a molecular weight of at least 5,000 and being added in an amount to precipitate solubilized silica, and thereafter recovering the metal value by extraction with the water immiscible liquid organic extractant.

16. The process of claim 15 wherein the aqueous medium has a pH not greater than 4.5.

17. The process of claim 15 wherein the organic compound has a molecular weight of at least 500,000.

18. The process of claim 15 wherein the aqueous medium has a pH not greater than 4.5 and the organic compound has a molecular weight of at least 500,000.

19. The process of claim 15 wherein the aqueous medium as a pH not greater than 4.5 and the organic compound is polyethylene glycol having a molecular weight of at least 500,000.

20. A process for precipitating a substance consisting essentially of solubilized silica contained in an acidic aqueous medium comprising admixing in the aqueous medium a water soluble poly(ethylene oxide), the aqueous medium containing solubilized silica precipitable with egg albumen, the poly(ethylene oxide) having a molecular weight of at least 5,000 and being added in an amount to precipitate solubilized silica.

21. The process of claim 20 wherein the aqueous medium has a pH not greater than 4.5.

22. The process of claim 20 wherein the poly(ethylene oxide) has a molecular weight of at least 500,000.

23. The process of claim 20 wherein the aqueous medium has a pH not greater than 4.5 and the poly(ethylene oxide) has a molecular weight of at least 500,000.

24. In a hydrometallurgical process for the recovery of a metal value from an aqueous medium containing an impurity consisting essentially of solubilized silica precipitable with egg albumen wherein the solubilized silica normally interferes with the recovery of the metal value, the improvement comprising precipitating solubilized silica from the aqueous medium by admixing therein water soluble poly(ethylene oxide), the water soluble poly(ethylene oxide) having a molecular weight of at least 5,000 and being admixed in the aqueous medium in an amount to precipitate solubilized silica, and thereafter recovering the metal value.

25. The process of claim 24 wherein the aqueous medium has a pH not greater than 4.5 and the poly(ethylene oxide) has a molecular weight of at least 500,000.

26. In a process for the recovery of a metal value from a clarified aqueous medium containing an impurity consisting essentially of solubilized silica precipitable with egg albumen by extraction with a water immiscible liquid organc extractant, the organic extractant and clarified aqueous medium being intermixed and the solubilized silica normally retarding separation of the organic extractant and aqueous phases, the improvement comprising precipitating the solubilized silica by admixing in the clarified aqueous medium a water soluble poly(ethylene oxide), the water soluble poly(ethylene oxide) having a molecular weight of at least 5,000 and being added in an amount to precipitate solubilized silica, and thereafter recovering the metal value by extraction with the water immiscible liquid organic extractant.

27. The process of claim 26 wherein the aqueous medium has a pH not greater than 4.5.

28. The process of claim 26 wherein the poly(ethylene oxide) has a molecular weight of at least 500,000.

29. The process of claim 26 wherein the aqueous medium has a pH not greater than 4.5 and the poly(ethylene oxide) has a molecular weight of at least 500,000.

30. The process of claim 1 wherein the acidic aqueous medium is substantially free of insoluble suspended siliceous material at the time of adding the said organic compound to precipitate solubilized silica.

31. The process of claim 1 wherein the acidic aqueous medium is a sulfuric acid leach liquor prepared by leaching uranium ore containing iron, aluminum and vanadium values, the leach liquor contains dissolved iron, aluminum and vanadium values and is clarified prior to addition of the said organic compound to precipitate the solubilized silica, and the said organic compound is added slowly to the clarified leach liquor to thereby precipitate the solubilized silica.

32. The process of claim 15 wherein the acidic aqueous medium is substantially free of insoluble suspended siliceous material at the time of adding the said organic compound to precipitate solubilized silica.

33. The process of claim 15 wherein the aqueous medium is a sulfuric acid leach liquor prepared by leaching uranium ore containing iron, aluminum and vanadium values, the leach liquor contains dissolved iron, aluminum and vanadium values and is clarified prior to addition of the said organic compound to precipitate the solubilized silica, and the said organic compound is added slowly to the clarified leach liquor to thereby precipitate the solubilized silica.

34. The process of claim 5 wherein the organic compound is polyethoxylated phenol.

35. The process of claim 13 wherein the organic compound is polyethoxylated phenol.

References Cited by the Examiner

UNITED STATES PATENTS

| | | |
|---|---|---|
| 2,882,250 | 4/1959 | Baker. |
| 3,020,229 | 2/1962 | Thompson _____ 210—54 |
| 3,020,230 | 2/1962 | Smith _____ 210—54 |
| 3,020,231 | 2/1962 | Colwell et al. _____ 23—14.5 X |
| 3,023,162 | 2/1962 | Fordyce _____ 210—54 |
| 3,146,193 | 8/1964 | Sullivan _____ 210—54 |
| 3,147,218 | 8/1964 | Booth _____ 210—54 |

FOREIGN PATENTS 1,213,798  11/1959  France.

OTHER REFERENCES

AEC Document DP–293, pp. 4–10, June 1958.

BENJAMIN R. PADGETT, *Acting Primary Examiner.*

CARL D. QUARFORTH, *Examiner.*

J. D. VOIGHT, S. TRAUB, *Assistant Examiners.*